United States Patent
Yang et al.

(10) Patent No.: US 12,116,472 B2
(45) Date of Patent: Oct. 15, 2024

(54) MOLDED ARTICLE HAVING A WOOD GRAIN-LIKE APPEARANCE

(71) Applicant: The Procter & Gamble Company, Cincinnati, OH (US)

(72) Inventors: Liang Yang, Beijing (CN); Ping Wang, Beijing (CN); Ruizhi Pei, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 383 days.

(21) Appl. No.: 17/037,871

(22) Filed: Sep. 30, 2020

(65) Prior Publication Data

US 2021/0095106 A1    Apr. 1, 2021

(30) Foreign Application Priority Data

Sep. 30, 2019   (WO) ................ PCT/CN2019/109585

(51) Int. Cl.
 *C08L 23/06* (2006.01)
 *B29B 7/02* (2006.01)
 (Continued)

(52) U.S. Cl.
 CPC ................ *C08L 23/06* (2013.01); *B29B 7/02* (2013.01); *B29C 49/0005* (2013.01);
 (Continued)

(58) Field of Classification Search
 CPC ........ C08L 23/06; C08L 2310/00; B29B 7/02; B29C 49/0005; B29C 49/04; B29C 49/48;
 (Continued)

(56) References Cited

U.S. PATENT DOCUMENTS

| | | |
|---|---|---|
| 9,085,681 B2 | 7/2015 | Majewski |
| 2005/0038189 A1 | 2/2005 | Takimoto et al. |
| (Continued) | | |

FOREIGN PATENT DOCUMENTS

| | | |
|---|---|---|
| CN | 2425764 Y | 4/2001 |
| CN | 202318872 U | 7/2012 |
| (Continued) | | |

OTHER PUBLICATIONS

PCT International Search Report and Written Opinion dated Jun. 22, 2020, PCT/CN2019/109585, 12 pgs.

(Continued)

*Primary Examiner* — Ling Siu Cho
*Assistant Examiner* — Ronald Grinsted
(74) *Attorney, Agent, or Firm* — William E. Gallagher; James Ernest Oehlenschlager

(57) ABSTRACT

Disclosed is a molded article, wherein the article has at least one layer having a wood grain-like appearance, wherein the layer comprises: a) a first thermoplastic material that is selected from the group consisting of: polyethylene (PE), polypropylene (PP), copolymers thereof, and any combinations thereof; and b) a second polymer material that is at least partially immiscible with said first thermoplastic material, in which said second polymer material is selected from the group consisting of: polyamide, polyethylene terephthalate (PET), copolymers thereof, and any combinations thereof; wherein said second polymer material has a Solubility Parameter (δ) of from about 10 (cal$^{1/2}$cm$^{-3/2}$) to about 20 (cal$^{1/2}$cm$^{-3/2}$), and a melting point of from about 194° C. to about 280° C. The present invention also relates to a mixture of masterbatches used for manufacturing the above molded articles, and a method of manufacturing the above molded articles. The present inventions provide wood grain- (Continued)

like appearance, while maintaining mechanical strength and barrier benefit.

6 Claims, 2 Drawing Sheets

(51) Int. Cl.
    *B29C 49/00*     (2006.01)
    *B29C 49/04*     (2006.01)
    *B29C 49/48*     (2006.01)
    *B29K 23/00*     (2006.01)
    *B29K 105/00*     (2006.01)
    *B29L 31/00*     (2006.01)

(52) U.S. Cl.
    CPC .............. *B29C 49/04* (2013.01); *B29C 49/48* (2013.01); *B29K 2023/065* (2013.01); *B29K 2105/0032* (2013.01); *B29L 2031/7158* (2013.01); *C08L 2310/00* (2013.01)

(58) Field of Classification Search
    CPC ...... B29K 2023/065; B29K 2105/0032; B29L 2031/7158
    USPC ........................................................ 524/514
    See application file for complete search history.

(56) References Cited

U.S. PATENT DOCUMENTS

| | | |
|---|---|---|
| 2015/0329720 A1 | 11/2015 | Mulholland |
| 2015/0343694 A1 | 12/2015 | Wang |
| 2016/0368649 A1 | 12/2016 | Eschenburg |

FOREIGN PATENT DOCUMENTS

| | | |
|---|---|---|
| CN | 208645998 U | 3/2019 |
| CN | 209409296 U | 9/2019 |
| EP | 0189270 A2 | 7/1986 |
| EP | 0438339 A2 | 7/1991 |
| JP | S54154452 A | 12/1979 |
| JP | H08216233 A | 8/1996 |
| JP | 10071680 | 3/1998 |
| JP | H10217325 A | 8/1998 |
| JP | H1199557 A | 4/1999 |
| JP | 2002226577 A | 8/2002 |
| JP | 2005008807 A | 1/2005 |
| JP | 2008120030 A | 5/2008 |
| JP | 2009137159 A | 6/2009 |
| JP | 2011174038 A | 9/2011 |
| JP | 52122665 | 3/2013 |
| JP | 2018058604 A | 4/2018 |
| JP | 2019155684 A | 9/2019 |
| WO | WO2011132795 A1 | 10/2011 |
| WO | 2021062693 A1 | 4/2021 |

OTHER PUBLICATIONS

Supplemental Search Report and Written Opinion; U.S. Appl. No. 17/037,871; dated Dec. 21, 2021 ; 7 Pages.

MOLDED ARTICLE HAVING A WOOD GRAIN-LIKE APPEARANCE

FIELD OF THE INVENTION

The present invention relates to a molded article, wherein the article has at least one layer having a wood grain-like appearance, wherein the layer comprises: a) a first thermoplastic material that is selected from the group consisting of: polyethylene (PE), polypropylene (PP), copolymers thereof, and any combinations thereof; and b) a second polymer material that is at least partially immiscible with said first thermoplastic material, in which said second polymer material is selected from the group consisting of: polyamide, polyethylene terephthalate (PET), copolymers thereof, and any combinations thereof; wherein said second polymer material has a Solubility Parameter ($\delta$) of from about 10 ($cal^{1/2}cm^{-3/2}$) to about 20 ($cal^{1/2}cm^{-3/2}$), and a melting point of from about 194° C. to about 280° C. The present invention also relates to a mixture of masterbatches used for manufacturing the above molded articles, and a method of manufacturing the above molded articles. The present inventions provide wood grain-like appearance, while maintaining mechanical strength and barrier benefit.

BACKGROUND OF THE INVENTION

In recent years, articles such as interior household articles having a grain-like colored pattern appearance are spread, and in particular, a lot of articles on which a film having a printed grain pattern is stuck and articles obtained by fixing a film in a die and integrally injection-molding it to stick the above film on the articles are available in the market as such articles.

However, these methods have the problems that:
- a step for sticking a film is essential and much labor is required;
- a printed film is broken or molten in many cases when injecting and filling a base resin, which reduces the yield; and/or
- it's difficult to apply for articles having curved and/or complicated shapes In order to solve these problems, there is a method in which a resin pellet is dry-blended with a pigment master batch having a relatively inferior dispersibility and the blended matter is molded by melt-extrusion or injection, whereby flow stripes of a pigment are formed by a flowing and stretching effect of the resin in extrusion or injection to produce specific stripe patterns.

However, even in this method, there might be some problems in recycled articles that the impact strength and the pinch-off strength are reduced.

Further, also in extrusion molding, a welding property between a base resin and a colored part in a molding material is not so good, and therefore the problem of a reduction in the impact resistance is occurred in a certain case.

However, even if the color pigment master batch described above is dry-blended in order to color a grain pattern on such molding material to carry out injection-, extrusion- or blow-molding, a wood powder becomes a hindrance to make it difficult to produce a grain pattern.

For example, Japanese Patent Application Publication No. H10-217325A discloses a manufacturing method of plate-shaped resin molded product with grain pattern, wherein a molding material is manufactured by mixing a base material composed of a styrene resin composition and having the melt viscosity of $1.0 \times 10^4$-$7.0 \times 10^4$ poise with a granular coloring material composed of a composition formed of a coloring material and styrene resin and having the melt viscosity of $9.0 \times 10^4$-$5.0 \times 10^5$ poise, and wherein the difference of melt flow index values of the base material and the coloring material is preferably 2 or less. Such method is said in this JP publication to provide a molded product of good mechanical strength.

Another example is WO03033572 disclosing a color pigment master batch composition, characterized by comprising the following components (A) to (E) as a color pigment master batch which is dry-blended into a molding material to color it: (A) 30 to 70% by weight of a thermoplastic elastomer satisfying the following characteristics (i) and (ii): (i) the thermoplastic elastomer having a higher Vicat softening point than the following standard temperature and a melting point or a flow beginning temperature which is higher by 20° C. or more than the standard temperature, wherein the standard temperature is a melting point thereof when a base resin in the molding material is a crystalline resin and a flow beginning temperature of the base resin when the base resin described above is an amorphous resin and (ii) the thermoplastic elastomer having a higher MFR (melt flow rate) than MFR of the base resin in the molding material, provided that MFR's of the thermoplastic elastomer and the base resin are measured on the same conditions; (B) 5 to 40% by weight of a polystyrene base thermoplastic resin; (C) 0 to 40% by weight of a polyolefin base thermoplastic resin; (D) 3 to 20% by weight of a thermoplastic resin having at least one functional group selected from an acid, a hydroxy group and an oxide group, and (E) 3 to 30% by weight of a pigment component.

It is said in this WO'572 publication that the composition can develop a colored wood grain clearly, can effectively inhibit the pinch-off part strength or impact strength from being reduced by wood grain formation, can be molded not only by blow molding but by injection molding or extrusion molding, and can diminish influences of base color differences to thereby reduce the rate of rejected products due to a color difference even when recycle materials containing a pigment are molded.

One more example could be WO2012109489 disclosing a low gloss capstock compound, comprising:
(a) polyethylene in both pellet form and powder or flake form;
(b) metal-based ionomer thermoplastic resin, wherein the metal is selected from the group consisting of magnesium and zinc;
(c) acid scavenger for the metal-based ionomer thermoplastic resin;
(d) gloss inhibiting agents comprising silica and barium sulfate;
wherein, when a surface of a strip of the compound is tested according to ASTM D523, D2457, the surface has a Gloss Angle at 85° of less than 10 GU.

However, there still remains a need to provide molded articles with wood grain-like appearance, while maintaining mechanical strength and barrier benefit, especially in blow molding. There also exists a need for such molded articles to provide with improved wood grain-like appearance such as a sharper and/or better wooden pattern presentation. There also remains a need for such molded articles to further provide with recyclability.

SUMMARY OF THE INVENTION

The present invention is related to a molded article, wherein the article has at least one layer having a wood grain-like appearance, wherein the layer comprises:

a) a first thermoplastic material that is selected from the group consisting of: polyethylene (PE), polypropylene (PP), copolymers thereof, and any combinations thereof; and
b) a second polymer material that is at least partially immiscible with said first thermoplastic material, in which said second polymer material is selected from the group consisting of: polyamide, polyethylene terephthalate (PET), copolymers thereof, and any combinations thereof;

wherein said second polymer material has a Solubility Parameter (δ) of from about 10 $(cal^{1/2}cm^{-3/2})$ to about 20 $(cal^{1/2}cm^{-3/2})$, and a melting point of from about 194° C. to about 280° C.

The present invention is also directed to a mixture of masterbatches for preparing the molded article, wherein said mixture comprises:
a) a first color masterbatch comprising a first thermoplastic material selected from the group consisting of: polyethylene (PE), polypropylene (PP), copolymers thereof, and any combinations thereof; and
b) a second color masterbatch comprising a second polymer material that is at least partially immiscible with said first thermoplastic material, in which said thermoplastic material is selected from the group consisting of polyamide, polyethylene terephthalate (PET), copolymers thereof, and any combinations thereof, wherein said second polymer material has a Solubility Parameter (δ) of from about 10 $(cal^{1/2}cm^{-3/2})$ to about 20 $(cal^{1/2}cm^{-3/2})$, and a melting point of from about 194° C. to about 280° C., wherein said first color masterbatch and said second color masterbatch satisfy:
(1) the weight ratio of said first color masterbatch to said second color masterbatch is from 30:1 to 1:30; and
(2) a hue of a colorant constituting said first color masterbatch is paired with a hue of a colorant constituting said second color masterbatch, and one of the paired hues is selected from hues falling in the same range as those of yellow, red, green, blue and purple which show basic colors in a Munsell hue ring and the other of the paired hues is selected from brown, grey, black and white.

The present invention is further directed to a method of making a blow molded article having at least one layer, comprising the steps of:
a) forming a blend for the layer by mixing a resin and a mixture of masterbatches;
b) extruding said blend for the layer through a die head to form a preform or parison; and
c) blow molding the preform or parison to form an article having the layer;
wherein the die head has at least one hole and at least one spiral groove connected to an exit of the hole, to form a spiral string of the blend to the spiral string of the blend forms the preform or parison.

The present inventions provide wood grain-like appearance, while maintaining mechanical strength and barrier benefit. In one embodiment, the present inventions provide improved wood grain-like appearance with a sharper and/or better wooden pattern presentation, while maintaining mechanical strength and barrier benefit. In one embodiment, the present inventions may also provide recyclability, in addition to the above benefits.

DETAILED DESCRIPTION OF THE INVENTION

Molded Article

Figure 1:
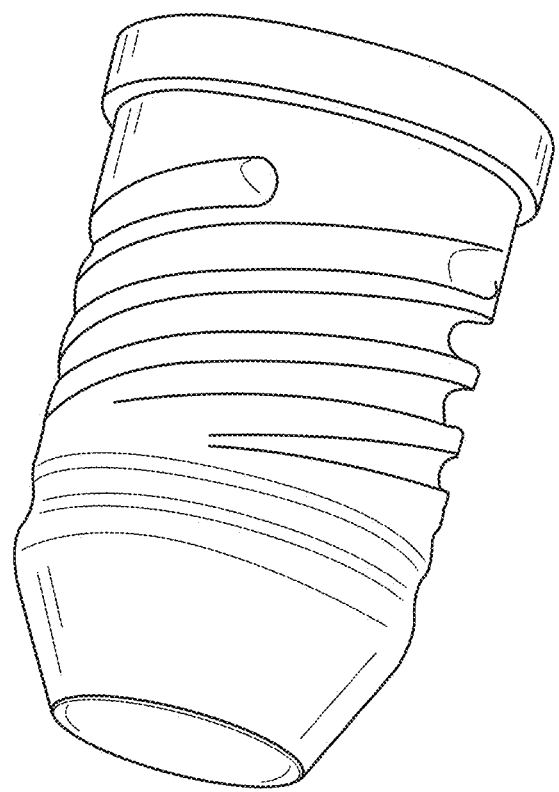
FIG. 1 illustrates a perspective view of a die head used in a method of making according to one embodiment of the present invention.

The molded article of the present invention has at least one layer having a wood grain-like appearance, wherein the layer comprises:
a) a first thermoplastic material that is selected from the group consisting of: polyethylene (PE), polypropylene (PP), copolymers thereof, and any combinations thereof; and
b) a second polymer material that is at least partially immiscible with said first thermoplastic material, in which said second polymer material is selected from the group consisting of polyamide, polyethylene terephthalate (PET), copolymers thereof, and any combinations thereof.

The present inventions provide wood grain-like appearance, while maintaining mechanical strength and barrier benefit. In one embodiment, the present inventions provide improved wood grain-like appearance with a sharper and/or better wooden pattern presentation, while maintaining mechanical strength and barrier benefit. In one embodiment, the present inventions may also provide recyclability, in addition to the above benefits.

The first thermoplastic material is preferably PE, copolymers thereof, and any combinations thereof, and more preferably is selected from the group consisting of high density polyethylene (HDPE), low density polyethylene (LDPE), linear low density polyethylene (LLDPE), copolymers thereof, and any combinations thereof. Still more preferably the first thermoplastic material is HDPE. PCR (post consumer recycle) polymers of these polymers can also be used.

The second polymer material is preferably polyamide (PA), copolymers thereof, and any combinations thereof, in view of compatibility with HDPE processing condition and maybe recyclability too. More preferably, the polyamides, copolymer thereof, or mixture thereof is selected from PA6 (Nylon 6), PA66 (Nylon 66), PA610 (Nylon 610), PA1010 (Nylon 1010), and any combinations thereof. Still more preferably the second polymer material is selected from PA6 (Nylon 6), PA66 (Nylon 66), PA610 (Nylon 610), and any combinations thereof. Furthermore preferably the second polymer material is PA6 (Nylon 6). The combination of HDPE as the first thermoplastic material and PA6 as the second polymer material is especially preferred for blow molding and for providing improved wood grain-like appearance.

The second polymer material is at least partially immiscible with the first thermoplastic material. "Being at least partially immiscible" means that the delta between "Solubility Parameters (δ)" of the first and second polymer materials is at least $0.5(cal^{1/2}cm^{-3/2})$, preferably at least $1(cal^{1/2}cm^{-3/2})$, more preferably at least 2 $(cal^{1/2}cm^{-3/2})$. The delta between "Solubility Parameters (δ)" of the first and second polymer materials may be preferred to be up to about 10 $(cal^{1/2}cm^{-3/2})$.

As used herein, the term "Solubility Parameter (δ)" provides a numerical estimate of the degree of interaction between materials. A Solubility Parameter difference between materials indicates miscibility of the materials. For example, materials with similar δ values are likely to be miscible, and materials having a larger δ difference tend to be more immiscible. The Hildebrand Solubility Parameter is used herein for purposes to characterize a material's δ. The calculation method of the Hildebrand δ is described as follows:

The Hildebrand δ is the square root of the cohesive energy density, as calculated by:

$$\delta = \sqrt{\frac{\Delta H_v - RT}{V_m}} \quad (1)$$

wherein the cohesive energy density is equal to the heat of vaporization ($\Delta H_v$) divided by molar volume ($V_m$), R is the gas constant (8.314 J·K$^{-1}$mol$^{-1}$), and T is absolute temperature. The δ data of various thermoplastic materials can be calculated by the above method and is readily available from books and/or online databases.

Solubility Parameter (δ) of some of the first thermoplastic material and second polymer material useful herein are listed as follows:

| | Solubility Parameter (Hildebrand δ) (cal$^{1/2}$cm$^{-3/2}$) |
|---|---|
| HDPE | 7.9 |
| LDPE | 7.9 based on theoretical analysis |
| LLDPE | 7.9 based on theoretical analysis |
| PP | 8.1 |
| PA6 (m.p. = 225° C.) | 10.8 |
| PA66 (m.p. = 268.8° C.) | 11.4 |
| PA610 (m.p. = 210~220° C.) | 11.3 |
| PET (m.p. = 260° C.) | 10.7 |

The second polymer material useful herein have a "Solubility Parameter (δ)" of from about 10 (cal$^{1/2}$cm$^{-3/2}$) to about 20(cal$^{1/2}$cm$^{-3/2}$).

Also, preferably, the delta between the melting points of the first and the second polymer material is from about 60° C. to about 150° C., from about 60° C. to about 130° C., more preferably from about 70° C. to about 120° C., still more preferably from about 90° C. to about 110° C.

The second polymer material useful herein have a melting point: from about194° C. to about 280° C., preferably from about 210° C. to about 270° C., more preferably from about 210° C. to about 250° C.

The layer having a wood grain-like appearance comprises:

from 30% to 99.9%, preferably from 50% to 99.8%, more preferably from 70% to 99.5%, still more preferably from 80% to 99.5%, most preferably from 95.0% to 99.5%, of said first thermoplastic material by weight of said layer, and from 0.01% to 30%, preferably from 0.05% to 10%, more preferably from 0.1% to 5%, still more preferably from 0.2% to 2% of said second polymer material by weight of said layer.

The molded article of the present invention is preferably recyclable. The range of 0.2% to 2% of the second polymer material in the layer is preferred in view of recyclability, especially when PE is used as the first thermoplastic material and polyamide is used as the second polymer material.

Also, in view of recyclability, the layer and/or the molded articles are preferably substantially free of: metal or metal containing materials such as metal-based ionomer thermoplastic resin; and/or inorganic materials such as gloss inhibiting agents comprising silica and barium sulfate. In the present invention, "the layer and/or article being substantially free of X" means that: the layer and/or article is free of X; or, if the layer and/or article contains X, the level of such X is very low. In the present invention, a total level of such X is, if included, preferably 2% or less, more preferably 1.5% or less, still more preferably 0.5% or less, furthermore preferably 0.1% or less by weight of the layer and/or article. Most preferably, the total level of such X is 0% by weight of the layer and/or article.

The molded article can be produced by any means, including for example, extrusion blow molding, injection stretch blow molding, injection blow molding, or injection molding or thermal forming. Preferably, the molded articles are made by blow molding, more preferably extrusion blow molding.

For preferred wood grain-like appearance, the molded articles preferably have at least one of the following parameters (i) and (ii), more preferably both of the following parameters (i) and (ii):

(i) a Wood pattern sharpness (WPS) Value of from 0.3 to 5, more preferably from 0.5 to 2, as measured by the Method for Imaging Analysis;

(ii) a Wood pattern width (WPW) Value of from 0.5 to 6, more preferably from 2 to 4, as measured by the Method for Imaging Analysis.

Method for Imaging Analysis is described as follows:

(1) Image Acquisition

The bottle images were taken using SAMBA differential polarization camera system, the focal length of the lens is 50 mm (Bossa Nova Technologies, 605 Suite B Venice Blvd, Venice, Calif. 90291, USA). The bottles were placed in front of the camera with distance of 50 mm and the focus was adjusted to make sure the image was in focus.

A full calibration was done following the instructions of the SAMBA system before image acquisition. The image acquisition setting used was: exposure time of 50 s, to achieve an image with proper exposure and contrast. The image resolution using this setup is around 7 pixel/mm The diffuse (crossed image) image was saved in RGB color space with tiff format for further analysis.

(2 (i)) Image Analysis for WPS

Figure 2:
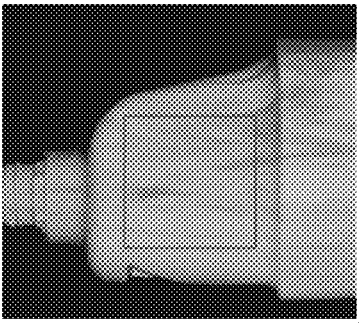
FIG. 2 illustrates images of the molded articles discussed in Example.

The image analysis of the wood pattern sharpness (WPS) was conducted by the following steps:

a) The bottle image was firstly imported into Image J software (version. 1.52 h, National Institute of Health, USA).

b) The analysis area, with a width of 60 mm and height of 60 mm, illustrated by FIG. 2, was cropped out from the original image. For small samples, a minimum area covering at least 50% of the bottle front surface projection area is needed for the calculation to be representative.

c) Then the cropped image was filtered with a Gaussian blur of Sigma (Radius) of 2 to remove noise and imported into MATLAB (The MathWorks, Inc, R2017b) for further calculation.

d) In MATLAB, the input image was converted into gray level image in double format and then calculate the gradient in vertical and horizontal direction. The wood pattern sharpness was calculated by using the average square root of the gradient in both horizontal and vertical direction. The full codes are shown as:

Gray_Image=double(rgb2gray(Input_Image));

[$Gx$, $Gy$]=gradient(Gray_Image);

$$S=\text{sqrt}(Gx.*Gx+Gy.*Gy);$$

Wood Pattern Sharpness=sum(sum(S))./(numel(Gx));

(2 (ii)) Image Analysis for WPW

The image analysis of wood pattern width (WPW) was conducted by the following steps:
  a) The cropped image (same as the image obtained after step b in WPS calculation) was imported into Image J software (version. 1.52 h, National Institute of Health, USA).
  b) The wood pattern was extracted using the image calculator through "difference" operation between images with Gaussian blur of Sigma (Radius): 2 and 100 respectively.
  c) The difference image was auto-thresholded using the Otsu method, where the wood pattern was set to 255 and the rest set to 0. The scale of the image was set in the "set scale" module, Distance in pixels: 7; Know distance: 1; Unit of length: mm
  d) The wood pattern width calculation was conducted on the binary image in step c) by using the "Local thickness (masked, calibrated and silent") module. The wood pattern width value was obtained by taking the mean value of the histogram of local thickness map.

Mixture of Masterbatches

A mixture of masterbatches of the present invention, which is for preparing a molded article, comprises:
  a) a first color masterbatch comprising a first thermoplastic material selected from the group consisting of: PE, PP, copolymers thereof, and any combinations thereof; and
  b) a second color masterbatch comprising a second polymer material that is at least partially immiscible with said first thermoplastic material, in which said thermoplastic material is selected from the group consisting of polyamide, polyethylene terephthalate (PET), copolymers thereof, and any combinations thereof;
wherein said first color masterbatch and said second color masterbatch satisfy:
  (1) the weight ratio of said first color masterbatch to said second color masterbatch is from 30:1 to 1:30; and
  (2) a hue of a colorant constituting said first color masterbatch is paired with a hue of a colorant constituting said second color masterbatch, and one of the paired hues is selected from hues falling in the same range as those of yellow, red, green, blue and purple which show basic colors in a Munsell hue ring and the other of the paired hues is selected from brown, grey, black and white.

Preferably, the mixture of masterbatches is for preparing the molded article described above, i.e., the molded article having a layer having a wood grain-like appearance, and the mixture of masterbatches is use for preparing the layer.

Details of the first thermoplastic material and the second polymer material useful herein for the masterbatches are explained above for the molded articles. However, in the masterbatches, LDPE is preferred than other PEs such as HDPE.

Preferably in the present invention, the hue of the colorant constituting said second color masterbatch is selected from brown, grey, black and white, and the hue of the colorant constituting said first color masterbatch is selected from hues falling in the same range as those of yellow, red, green, blue and purple which show basic colors in a Munsell hue ring.

The weight ratio of said first color masterbatch to said second color masterbatch is preferably from 10:1 to 1:10, preferably from 5:1 to 1:2, more preferably from 3:1 to 1:1.

The mixture of the masterbatch may further comprise:
  c) a third color masterbatch comprising a third thermoplastic material that is at least partially immiscible with said first thermoplastic material, in which said third thermoplastic material is selected from the group consisting of: selected from the group consisting of polyamide, polyethylene terephthalate (PET), and mixtures thereof.

When the third color masterbatch is used, it may be preferred that the said hue of the colorant constituting said first color masterbatch is paired with a hue of a colorant constituting said third color masterbatch, and one of the paired hues is selected from hues falling in the same range as those of yellow, red, green, blue and purple which show basic colors in a Munsell hue ring and the other of the paired hues is selected from brown, grey, black and white. More preferably, the hue of the colorant constituting said third color masterbatch is selected from brown, grey, black and white, and the hue of the colorant constituting said first color masterbatch is selected from hues falling in the same range as those of yellow, red, green, blue and purple which show basic colors in a Munsell hue ring. The third color masterbatch may be contained at a level such that the weight ratio of said first color masterbatch to said third color masterbatch is from 10:1 to 1:10, preferably from 5:1 to 1:5, more preferably from 2:1 to 1:2.

The masterbatches useful herein preferably have:
  an average diameter of from 0.1 mm to 10 mm, more preferably from 0.5 mm to 6 mm, still more preferably from 1 mm to 4 mm; and/or
  an average length of from 0.1 mm to 10 mm, more preferably from 0.5 mm to 6 mm, still more preferably from 1 mm to 4 mm Method of Making a Blow Molded Article The method of making a blow molded article having at least one layer, comprises the steps of:
  a) forming a blend for the layer by mixing a resin and a mixture of masterbatches, preferably, the resin is the first thermoplastic polymer described above for the molded articles and the mixture of the masterbatch is that described above;
  b) extruding said blend for the layer through a die head to form a preform or parison; and
  c) blow molding the preform or parison to form an article having the layer, preferably to form the molded article described above wherein the layer has a wood grain-like appearance;
wherein the die head has a hole and a spiral groove connected to an exit of the hole, to form a spiral string of the blend, the spiral string of the blend forms the preform or parison.

In the above method, this spiral string forms a continuous tubal shape around the die head and/or after passing the die head with or without help of a further guide means. This continuous tubal shaped blend is usually called as "preform or parison".

In the above method, process temperature is preferably in-between the melting point of the resin and the melting point of the masterbatch, more preferably, in between the melting point of the resin selected from the first thermoplastic material and the melting point of the second polymer material used in the masterbatch. In more detail, the process temperature is preferably from 0° C. to 40° C. lower than the melting point of the second polymer material, more preferably from 10° C. to 30° C., still more preferably from 10° C. to 20° C. lower than the melting point of the second polymer material. Also, the process temperature is preferably from 70° C. to 120° C. higher than the melting point of the first thermoplastic polymer used as the resin, more preferably from 70° C. to 100° C., still more preferably from 70° C. to 80° C. higher than the melting point of the first thermoplastic polymer used as the resin.

The die head has two or more holes and the spiral groove connected to an exit of each hole, to form spiral strings of the blend, and the spiral strings of the blend forms a single preform or parison. The die head can have multiple holes, such as from 2 to 20 holes, preferably from 2 to 15 holes, more preferably from 3 to 10 holes, still more preferably from 3 to 5 holes, in view of a balance between improved wood grain-like appearance and die head structure complexity when having too many holes.

Each of the holes preferably has a maximum size (diameter or length, whatever the largest part of the hole) of 0.1 mm to 10 mm, more preferably 0.2 mm to 5 mm, still more preferably 0.5 mm to 4 mm, even more preferably 1 mm to 3 mm Each of the holes can have a shape of circular, semicircular, oval, square, rectangular, crescent, an annulus sector and any combinations thereof, preferably circular or an annulus sector.

The blend preferably comprises:
 i) from about 30% to about 99.9%, preferably from 50% to 99.8%, more preferably from 70% to 99.5%, still more preferably from 80% to 99%, most preferably from 95.0% to 99%, of said resin by weight of the blend; and
 ii) from about 0.01% to about 20%, preferably from 0.1% to 15%, more preferably from 0.2% to 10%, most preferably from 0.4% to 8%, by weight of said mixture of masterbatches by weight of the blend.

In more detail, the blend preferably comprises:
 i) from about 30% to about 99.9%, preferably from 50% to 99.8%, more preferably from 70% to 99.5%, still more preferably from 80% to 99%, most preferably from 95.0% to 99%, of said resin by weight of the blend;
 ii) from about 0.01% to about 10%, preferably from 0.05% to 8%, more preferably from 0.1% to 5%, most preferably from 0.2% to 4%, by weight of said first color masterbatch by weight of the blend; and
 iii) from about 0.01% to about 5%, preferably from 0.05% to 4%, more preferably from 0.1% to 3%, most preferably from 0.2% to 2%, by weight of said second color masterbatch by weight of the blend.

Inner Layer

In the above molded article, the layer having wood grain-like appearance is usually used as an outer layer. The molded article can also have an inner layer. The inner layer can be formed by a resin with or without additional masterbatch, preferably with masterbatch, more preferably $TiO_2$ white masterbatch. The resin is preferably the first thermoplastic material described above for the molded articles, i.e., more preferably HDPE. The additional masterbatch also preferably comprises the first thermoplastic materials, more preferably LDPE for the masterbatches. In the above method, the inner layer usually extruded together with the outer layer and form the preform or parison together with the outer layer.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention. Where applicable, ingredients are identified by chemical name, or otherwise defined below.

|  |  | Example 1 | Example 2 |
|---|---|---|---|
| Formulation for the outer layer having wooden-like, which is also called as a "blend" (The outer layer forms 15-20% of thickness of the article) | % | Description | Same as Ex. 1 |
|  | 0.5% | $2^{nd}$ masterbatch using Nylon 6 as carrier having brown color |  |
|  | 1% | $1^{st}$ masterbatch using LDPE as carrier, having yellow color |  |
|  | 98.5% | HDPE base resin |  |
| Formulation for the inner layer (The inner layer forms 80-85% of the thickness of the article) | % | Description | Same as Ex. 1 |
|  | 2% | Masterbatch using LDPE as carrier, having white color by containing $TiO_2$ |  |
|  | 98% | HDPE base resin |  |
| Manufacturing method | Extrusion Blow molding | | Extrusion Blow molding |
| Die head shape | Shown in FIG. 1, having 4 holes and spiral groves connecting exits of the holes. The blend is extruded from the holes and forms spiral strings along with the spiral groove. The spiral strings form a continuous tubal shape around the die head and/or after passing the die head with or without help of a further guide means, and to form an outer layer of a preform or parison | | Conventional die head, having an almost tubal gap between inner and outer wall of the die head. Differently from the die head shown in FIG. 1, this conventional die head does not have any spiral grooves or holes. The blend is extruded from the gap to form an outer layer of a preform or parison. |
| Temperature conditions | External Layer Process temperature: 200-210° C. Inner layer process temperature: 180-190° C. | | |
| WPS | 0.586 | | 0.265 |
| WPW | 3.857 | | 6.714 |

Molded articles of Ex. 1 and Ex. 2 are shown in FIG. 2.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A molded article, wherein the article has at least one layer having a wood grain appearance, wherein the layer comprises:
    a) from 50.0% to 99.8% by weight of a first thermoplastic material that is selected from the group consisting of: polyethylene (PE), polypropylene (PP), copolymers thereof, and any combinations thereof; and
    b) from 0.05% to 10% by weight of a second polymer material that is at least partially immiscible with said first thermoplastic material, in which said second polymer material is selected from the group consisting of: polyamide, polyethylene terephthalate (PET), copolymers thereof, and any combinations thereof;
    wherein said second polymer material has a Solubility Parameter ($\delta$) of from about 10 $cal^{1/2}cm^{-3/2}$ to about 20 $cal^{1/2}cm^{-3/2}$, and a melting point of from about 194° C. to about 280° C.; and
    wherein the first thermoplastic material and the second polymer material have respective melting points that differ by from about 90° C. to 110° C.

2. The molded article according to claim 1, wherein said first thermoplastic material is selected from the group consisting of high density polyethylene (HDPE), low density polyethylene (LDPE), linear low density polyethylene (LLDPE), copolymers thereof, and any combinations thereof.

3. The molded article according to claim 1, wherein said second polymer material is polyamide, copolymers thereof, and any combinations thereof.

4. The molded article according to claim 1, wherein said molded article is extrusion blow molded, injection stretch blow molded, injection blow molded, or injection molded.

5. A molded article, wherein the article has at least one layer having a wood grain appearance, wherein the layer comprises:
    a) from 30.0% to 99.9% by weight of a first thermoplastic material that is selected from the group consisting of: polyethylene (PE), polypropylene (PP), copolymers thereof, and any combinations thereof; and
    b) from 0.05% to 10% by weight of a second polymer material that is at least partially immiscible with said first thermoplastic material, in which said second polymer material is selected from the group consisting of: polyamide, polyethylene terephthalate (PET), copolymers thereof, and any combinations thereof;
    wherein said second polymer material has a Solubility Parameter ($\delta$) of from about 10 $cal^{1/2}cm^{-3/2}$ to about 20 $cal^{1/2}cm^{-3/2}$, and a melting point of from about 194° C. to about 280° C.

6. A molded article, wherein the article has at least one layer having a wood grain appearance, wherein the layer comprises:
    a) from 50% to 99.8% by weight of a first thermoplastic material that is selected from the group consisting of: polyethylene (PE), polypropylene (PP), copolymers thereof, and any combinations thereof; and
    b) from 0.01% to 30.0% by weight of a second polymer material that is at least partially immiscible with said first thermoplastic material, in which said second polymer material is selected from the group consisting of: polyamide, polyethylene terephthalate (PET), copolymers thereof, and any combinations thereof;
    wherein said second polymer material has a Solubility Parameter ($\delta$) of from about 10 $cal^{1/2}cm^{-3/2}$ to about 20 $cal^{1/2}cm^{-3/2}$, and a melting point of from about 194° C. to about 280° C.

* * * * *